(12) United States Patent
Loubet

(10) Patent No.: US 10,254,100 B2
(45) Date of Patent: Apr. 9, 2019

(54) HOLE INSPECTION DEVICE

(71) Applicant: Alema Automation, Merignac (FR)

(72) Inventor: Gerard Loubet, Merignac (FR)

(73) Assignee: KUKA Systems Aerospace, Le Haillan (FR)

( * ) Notice: Subject to any disclaimer, the term of this patent is extended or adjusted under 35 U.S.C. 154(b) by 35 days.

(21) Appl. No.: 15/535,774

(22) PCT Filed: Dec. 17, 2015

(86) PCT No.: PCT/EP2015/080263
§ 371 (c)(1),
(2) Date: Jun. 14, 2017

(87) PCT Pub. No.: WO2016/102309
PCT Pub. Date: Jun. 30, 2016

(65) Prior Publication Data
US 2017/0350682 A1 Dec. 7, 2017

(30) Foreign Application Priority Data
Dec. 22, 2014 (EP) .................................... 14307145

(51) Int. Cl.
*G01B 3/28* (2006.01)
*G01B 5/18* (2006.01)
(Continued)

(52) U.S. Cl.
CPC .............. *G01B 5/18* (2013.01); *B21J 15/142* (2013.01); *B21J 15/28* (2013.01); *G01B 3/28* (2013.01); *G01B 5/12* (2013.01)

(58) Field of Classification Search
CPC ........... B21J 15/142; B21J 15/28; G01B 3/28; G01B 5/12
(Continued)

(56) References Cited

U.S. PATENT DOCUMENTS

| 1,459,896 | A | * | 6/1923 | John | ........................ | G01B 3/28 33/544 |
| 4,936,024 | A | * | 6/1990 | Greenslade | .............. | G01B 3/28 33/556 |

(Continued)

FOREIGN PATENT DOCUMENTS

| EP | 2009388 A1 | 12/2008 |
| EP | 2808642 A1 | 12/2014 |

OTHER PUBLICATIONS

European Patent Office; Search Report and Written Opinion in International Patent Application No. PCT/EP2015/080263 dated Apr. 4, 2016; 9 pages.
(Continued)

*Primary Examiner* — G. Bradley Bennett
(74) *Attorney, Agent, or Firm* — Dorton & Willis, LLP

(57) ABSTRACT

A measuring device for inspecting a hole, which can favorably be mounted on a riveting robot adapted to insert a rivet into the hole after inspection. The measuring device includes a test mandrel having a hollow housing and interacting means, whereby the relative position of the interacting means can be detected to determine characteristics of the inspected hole. The measuring device further includes a bushing which is arranged movable relative to the test mandrel.

18 Claims, 5 Drawing Sheets

(51) Int. Cl.
   *B21J 15/28*      (2006.01)
   *B21J 15/14*      (2006.01)
   *G01B 5/12*       (2006.01)

(58) Field of Classification Search
   USPC ................................................. 33/1 BB, 542
   See application file for complete search history.

(56) References Cited

U.S. PATENT DOCUMENTS

| | | | | |
|---|---|---|---|---|
| 5,010,658 | A * | 4/1991 | Griffith | G01B 7/13 33/542 |
| 5,189,808 | A * | 3/1993 | Evans | G01B 3/28 33/542 |
| 7,363,721 | B2 * | 4/2008 | Nappier | G01B 3/28 33/542 |
| 8,464,434 | B1 | 6/2013 | Kostenick et al. | |
| 8,938,886 | B2 * | 1/2015 | Ross | B21D 31/04 264/40.1 |
| 9,579,712 | B2 * | 2/2017 | Schneider | B21J 15/02 |
| 2007/0051003 | A1 | 3/2007 | Bennison et al. | |
| 2012/0151788 | A1 | 6/2012 | Miller et al. | |
| 2016/0178343 | A1 * | 6/2016 | Hale | B23B 35/00 33/701 |

OTHER PUBLICATIONS

European Patent Office; Extended Search Report in European Patent Application No. 14307145.4 dated Apr. 4, 2016; 6 pages.

* cited by examiner

HOLE INSPECTION DEVICE

CROSS-REFERENCE

This application is a national phase application under 35 U.S.C. § 371 of International Patent Application No. PCT/EP2015/080263, filed Dec. 17, 2015 (pending), which claims the benefit of European Patent Application No. 14307145.4 filed Dec. 22, 2014, the disclosures of which are incorporated by reference herein in their entirety.

TECHNICAL FIELD

The present invention relates to a measuring device for inspecting a hole, and in particular to a measuring device for inspecting a hole drilled or punched for fastening.

BACKGROUND

Mechanical fasteners, such as rivets, are typically used to fasten work pieces and consist often of a cylindrical shaft with a head on one end. During the fastening process the fastener is placed in a hole which is punched out or drilled before. In the case of riveting, the shaft of the rivet expands, thereby holding the rivet in place.

Riveting is commonly applied for the assembly of e.g. commercial and military aircrafts. The rivets thereby carry crucial loads from one part of the aircraft to an adjoining part. Especially for the manufacturing of aeronautic components, the provision of a correct hole diameter for riveting is of great importance and the manufacturing tolerances are very tight. If the hole diameter is too big, the rivets may not be held in place properly and may unfavorably become loose during later operation. On the other hand, if the hole diameter is too small, the rivets may be difficult to install therein, or may be preloaded in a non-optimal manner. This can cause unwanted noise or even create a joint which does not provide an optimal strength. A further point is, that if the head of the rivet is not placed perfectly within the hole or its counter sink air turbulences can occur, which increase the fuel need and therefore have to be avoided.

During riveting, but also in many other fastening methods that make use of holes, the hole diameter is therefore typically checked with a measuring apparatus before installing a fastener, such as a rivet, therein. Thereby, a test mandrel (bore gauge) is inserted into the drilled or punched hole, and the lateral distance from the measuring rod to the walls of the hole is determined. This measurement is typically performed at high speed and with a high precision, i.e. in the range of µm.

However, with the known measurement or check-methods, it is not possible to characterize the edge at the surface of the hole. While it can on the one hand be desired for some applications that the holes have a sharp edge, the provision of a counter sink is also often required. It is easy to imagine that in particular the depth of a counter sink is crucial for a proper placement of a fastener into the hole. For example, if the depth of the counter sink is not correct, the end of the fastener may protrude from the surface of the work piece further than desired. For aeronautic applications, such improperly seated fasteners can cause additional fuel consumption and may even have a negative impact on the airworthiness of the airplane.

SUMMARY

In view of the above, it is an object of the present invention to provide a measuring device for inspecting a hole, and in particular for inspecting a hole drilled or punched for riveting, enabling both the measurement of the counter sink depth and the hole diameter of said hole. It is a further object of the present invention to provide a measuring device which can inspect a hole in a fast and preferably automated manner. It is another object of the present invention to provide a measuring device for inspecting a hole, whereby the measuring device can be provided on an effector for an industrial robot, for example for riveting work pieces.

According to the present invention there is provided a measuring device for inspecting a hole, and in particular for inspecting a hole for riveting. The hole may be punched out or drilled into an object for placing or installing a fastener, such as a rivet, inside. The measuring device comprises a test mandrel, which in turn comprises a hollow housing and interacting means. The interacting means are arranged in the housing and can protrude partially from an outer surface of the hollow housing of the test mandrel and are movable relative to the hollow housing. Accordingly, the distance of the interacting means from the outer surface of the hollow housing can change. Furthermore, the relative position of the interacting means can be detected by suitable detection means assigned to the device.

The measuring device further comprises a bushing in which the test mandrel is arranged. This bushing is arranged moveable relative to the test mandrel, i.e. test mandrel and bushing are movable relative to one another, between a first position and a second position. In the first position, the bushing covers the interacting means and is also in contact, and preferably in direct contact, with the interacting means, which as mentioned protrude at least partially from the outer surface of the hollow housing of the test mandrel. Preferably, the test mandrel tightly fits into the bushing. The bushing in the second position exposes the interacting means. In other words, the bushing is adapted to be moveable along the longitudinal extension of the test mandrel, thereby either covering or uncovering the interacting means. When the bushing is covering the interacting means, the bushing is contacting (i.e. interacting) with said interacting means. The relative position of the interacting means changes when the bushing is moved from the first position to the second position and vice versa.

Accordingly, since the relative position of the interacting means can be detected, it is possible to detect whether the bushing is in contact with the interacting means or not. This allows the determination of the depth of sink holes as will be explained in the following and offers further advantages, in particular for automated inspection processes. When the test mandrel is inserted into a hole to be inspected, the bushing is moved—e.g. since it abuts the surface surrounding the hole to be inspected—to the second position relative to the test mandrel, whereby the interacting means are exposed. Thereby, the interacting means advantageously move to their outermost position with regard to the housing of the test mandrel, e.g. by means of suitable restoring means adapted to apply a reset force to the interacting means. This change in relative position can be detected and by generating a corresponding signal one can determine when the interacting means enter the space provided e.g. by the counter sink of the hole.

Preferably, as mentioned briefly above, the test mandrel further comprises restoring means which are adapted to apply a reset force to urge the interacting means to protrude from the outer surface of the hollow housing, i.e. which urge the interacting means radially away from the hollow housing. Accordingly, the interacting means are urged to occupy a position in which the interacting means protrude from the outer surface of the hollow housing as far as practicable or as much as possible. In the first position of the bushing, the interacting means are thereby urged into contact with the inner wall of the bushing. When the bushing is in the second position and exposes the interacting means, the restoring means urge the interacting means to protrude further from the outer surface of the hollow housing.

Preferably, the hollow housing of the test mandrel is a hollow tube. Further preferred, also the bushing is a hollow tube with an inner diameter which is greater than the outer diameter of the hollow housing of the test mandrel. When the bushing is in its first position it envelopes the test mandrel at least partially, e.g. at least in the area where the interacting means extend or protrude from the hollow housing of the test mandrel. Further preferred, the inner diameter of the bushing is smaller than the maximum extension of the interacting means. Accordingly, when the bushing is in its first position, it covers the interacting means and is in contact therewith.

Preferably, the bushing comprises at least one recess or opening adapted to receive the interacting means at least partially when the bushing is in an initial position. Further preferred, when the bushing is moved from said initial position to another position, such as e.g. from the initial position to the first position, the relative position of the interacting means is changed. In other words, in the initial position of the bushing the interacting means are provided in said recess or opening and can thus protrude from the housing of the test mandrel to a large extend. When the bushing is moved the interacting means are forced out of the recess or opening inwardly into the bushing. As a result the (detectable) relative position of the interacting means is altered.

In practice, the bushing is moved from the first position to at least the second position when a hole to be inspected is engaged, and in particular when the test mandrel is inserted into said hole. When engaging the hole, the bushing comes first into contact with the surface surrounding the hole (it abuts the surface and cannot be moved any further in the direction of the hole). When the measuring device is now moved even further towards or into the hole, the bushing moves relative to the test mandrel, until the bushing reaches the second position and exposes the interacting means. As explained above, this exposure can be detected.

The measuring device according to the present invention is preferably configured to be employed at an end-effector for fastening work pieces, such as e.g. of a riveting robot, i.e. a machine which automatically performs all or some steps of a riveting process.

According to the present invention there is further provided an end effector for fastening work pieces that comprises a measuring device as described above.

There is further a method provided for inspecting a hole, in particular for inspecting a hole for rivets or similar fasteners, wherein a measuring device as described above is provided and moved towards a hole in a work piece until the bushing comes in abutment with a surface of the work piece surrounding said hole. When this is achieved the measuring device is further moved (the whole movement is preferably done without any stop) towards the hole, such that the test mandrel is moved relative to the bushing in the direction of the hole and finally into the hole. Upon the movement of the measuring device, the test mandrel will move relative to the bushing, since the bushing is in abutment with the work piece and can therefore not move any further. When the test mandrel is moved to some extend relative to (and out of) the bushing, the interacting means exit the bushing and become exposed. When the interacting means are no longer covered by the bushing, this is detected with the detection means and a signal S1 is generated. Upon further movement, the interacting means come into contact with the inner walls of the hole and this contact is then again detected with the detection means and a signal S2 is generated. Based on the signals S1 and S2 it is now possible to determine the distance the test mandrel covered between generating of the signals S1 and S2. This can for example be facilitated by a means that accurately measures the amount of movement of the test mandrel: when signal S1 is generated, the actual position of the test mandrel is e.g. determined by said means. The position can for example be the actual position in a predefined reference frame and could e.g. be the position in relation to the bushing. When the signal S2 is generated, again the actual position of the test mandrel is determined, whereby a comparison of the position at signal S1 and the position at signal S2 allows a precise determination of the distance traveled by the test mandrel. In case of a hole with a counter sink, this distance traveled can e.g. correspond to the depth of the counter sink.

Depending on the dimensions of the measuring device and the hole to be inspected, it is also e.g. possible to measure the shape and in particular the chamfer angle of a counter bore. If e.g. the interacting means protrude to a sufficient extend from the outer surface of the test mandrel, it is possible to measure the outer (major or maximum) diameter of the counter sink, and by forwarding the test mandrel deeper into the hole, also the contour of the counter sink, if the interacting means stay in contact with the walls of the counter sink and are thus continuously pushed inwards when the test mandrel is pushed deeper into the bore.

If the chamfer angle of the counter sink is known, it is also possible to calculate the outer diameter of the counter sink, once the depth of the counter sink is determined and the diameter of the entrance of the bore is measured (the diameter of the entrance of the bore corresponds to the inner or smallest diameter of the counter sink).

In use of the measuring device, it is particular advantageous when the test mandrel is turned or rotated within the bore and to take a plurality of signals. This allows a more precise measurement of the diameter of the bore and to check e.g. if the bore is circular and not (for example) oval or elliptical.

BRIEF DESCRIPTION OF THE DRAWINGS

In the following the invention is described exemplarily with reference to the enclosed figures.

DETAILED DESCRIPTION

FIGS. 1-5 schematically illustrate different steps of inspecting a hole with an exemplary measuring device 10 according to the present invention. The function of measuring device 10 will be explained in the following by this example.

Figure 1:
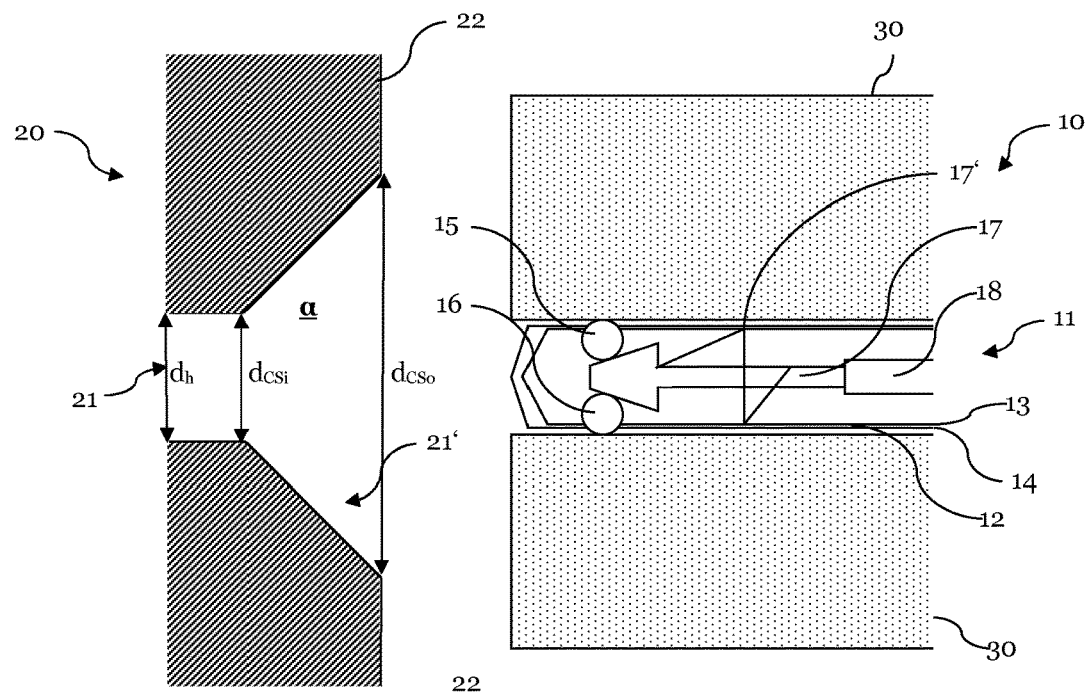
FIGS. 1 to 5 show schematic illustrations of a cross section of a measuring device for inspecting a hole according to the present invention at different working positions relative to a hole to be inspected.

FIG. 1 shows a schematic illustration of a cross section of measuring device 10 which is adapted for inspecting a hole 21. The hole 21 was prepared, i.e. drilled or punched into a work piece or object 20. Around the hole 21, the object 20 features a planar outside surface 22, while the hole 21 features a counter sink 21' with a counter sink depth $t_{CS}$. The hole 21 has an inner diameter $d_h$ that corresponds to the inner diameter $d_{CSi}$ of the counter sink 21'. The outer diameter (or major/maximum diameter) of the counter sink 21' is denoted as $d_{CSO}$ and in the shown example the counter sink 21' has a chamfer angle α of 90 degrees.

The measuring device 10 features a test mandrel 11, which comprises a hollow housing 12, which in turn features an inner wall 13 and an outer wall 14, which again in turn define the outer and inner diameter of the hollow housing 12. The test mandrel 11 further comprises interacting means 15, 16, which are provided in form of spherical elements arranged essentially inside the hollow housing 12. The skilled person thereby understands that the term "essentially inside" means that at least 50% of the spherical elements are arranged inside the hollow housing 12.

The interacting means 15, 16 partially extends through a circular opening of said hollow housing 12 and protrude from the housing. Since the diameter of the circular opening is less than the diameter of the spherical elements, the latter cannot completely drop out of the hollow housing 12. The skilled person understands that the interacting means 15, 16 can also be provided in different forms, such as e.g. in form of cones, wedges, and the like. The skilled person further understands that the interacting means 15, 16 can also be prevented from dropping out of the hollow housing 12 in different manners, such as e.g. by pinning the interacting means 15, 16 in a flexible manner inside the hollow housing 12.

The test mandrel 11 further features restoring means 17, which are adapted to apply a reset force to urge the interacting means 15, 16 to protrude from the outer surface of the hollow housing 12. Preferably, the restoring means 17 is pushed by means of a compression spring 17' (shown in FIG. 1) towards the tip of the test mandrel. In the shown embodiment, the restoring means 17 has a conical shaped tip, such that when the interacting means 15, 16 are moved radially inwards, they push the restoring means 17 to the left in the figures. Accordingly, when the restoring means 17 is moved to the left in the figures, the interacting means are urged radially outwardly. In the situation of FIG. 1, the interacting means 15, 16 push against the inner walls of a bushing 30, which is arranged moveable relative to the test mandrel 11.

The test mandrel 11 further comprises detection means 18 which are coupled to the restoring means 17 and are adapted to indicate the relative position of the interacting means 15, 16, since the relative position of the means 15, 16 are directly coupled to the position of the restoring means 17. Accordingly, when the relative position of the interacting means 15, 16 changes due to a displacement resulting from e.g. a force applied from outside the test mandrel 11 onto the interacting means 15, 16, the interacting means 15, 16 interact with the restoring means 17 and move the restoring means 17 to the right in FIG. 1. This movement of the restoring means 17 is detected by the detection means 18 and the same is able to generate a signal in response.

The measuring device 10 of FIG. 1 further features a bushing 30, which is surrounding the test mandrel 11. The inner diameter of the bushing 30 is such that the bushing 30 is in contact with the interacting means 15, 16 when the bushing 30 is covering them. The skilled person thereby understands that the inner diameter of the bushing 30 can vary. However, a defined portion of the bushing 30 should have an inner diameter such that the bushing 30 contacts the interacting means 15, 16 when in first position. The outer diameter of the bushing 30, or the overall dimensions of bushing 30 is larger than the counter sink width of hole 21 to be inspected. Accordingly, when the measuring device 10 is engaging the hole 21, the bushing 30 is not able to penetrate the hole 21 or the counter sink of hole 21.

Figure 2:
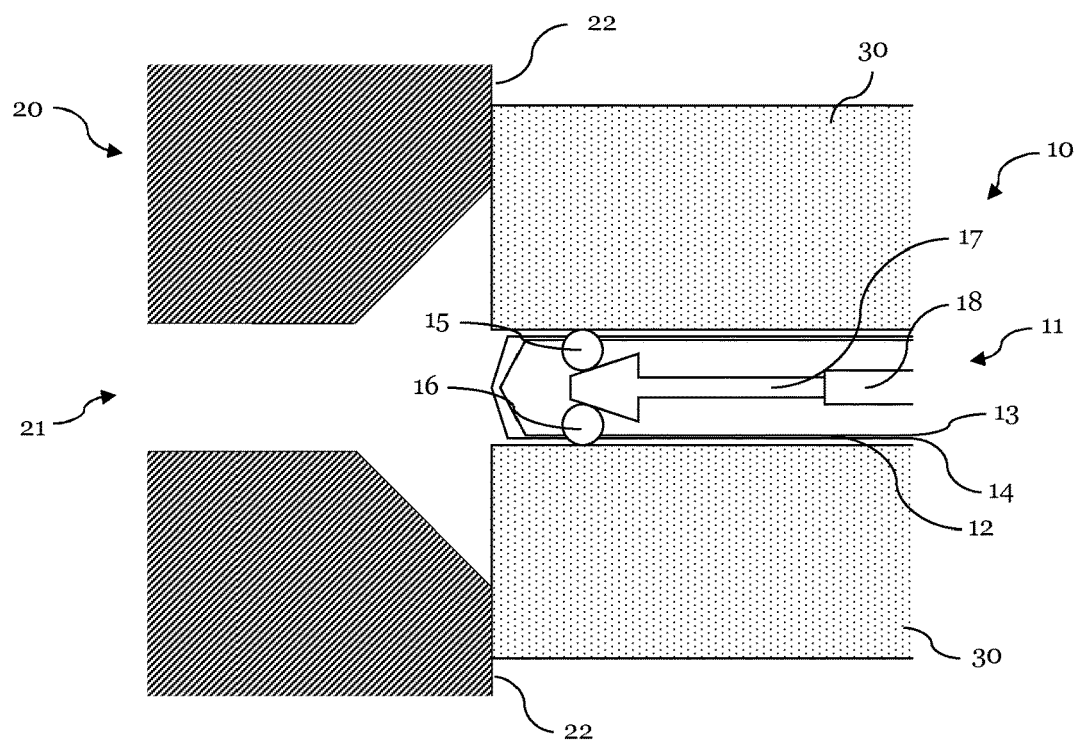

As illustrated in FIG. 2, when beginning inspection of hole 21, the measuring device 10 approaches the object 20 until the bushing 30 is in contact with the outer planar surface 22 of the object 20. The test mandrel 11 is aligned with hole 21. The bushing 30 is still in the first position of FIG. 1, where it is in contact with the interacting means 15, 16.

Figure 3:
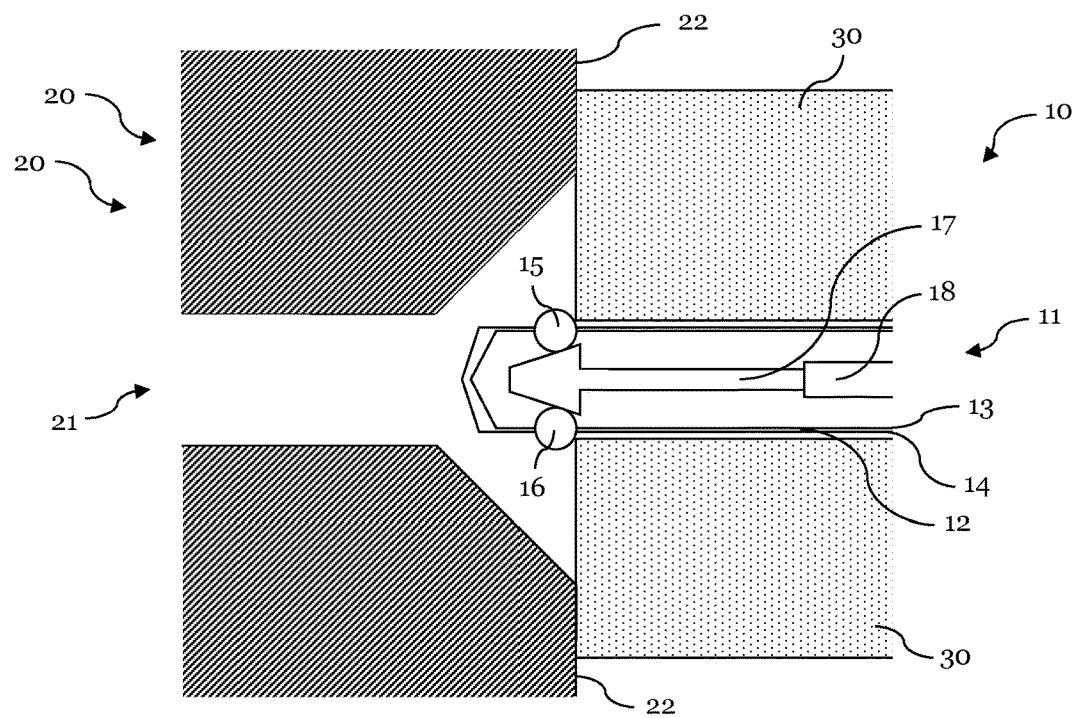

FIG. 3 shows a following step during inspection of hole 21. Preferably, the measuring device 10 comprises an automated actuating means which is adapted to move the test mandrel in longitudinal direction. Accordingly, the automated actuating means can move the test mandrel 11 to penetrate the hole 21 to be inspected. As can be seen in FIG. 3, the bushing 30 is moved relative to the test mandrel 11 due to the contact of the bushing 30 with the side walls 22 of object 20. As soon as the interacting means 15, 16 are no longer covered by the bushing 30, the relative position of the interacting means 15, 16 changes because the restoring means 17 urge the interacting means 15, 16 to protrude further from the hollow housing 12. The restoring means 17 moves forward (to the left in the figure) and this movement is detected by the detection means 18, which generates a signal in response. Thereby, the change in relative position of the interacting means 15, 16 is detected. The corresponding signal is denoted as signal S1 in the following.

Figure 4:
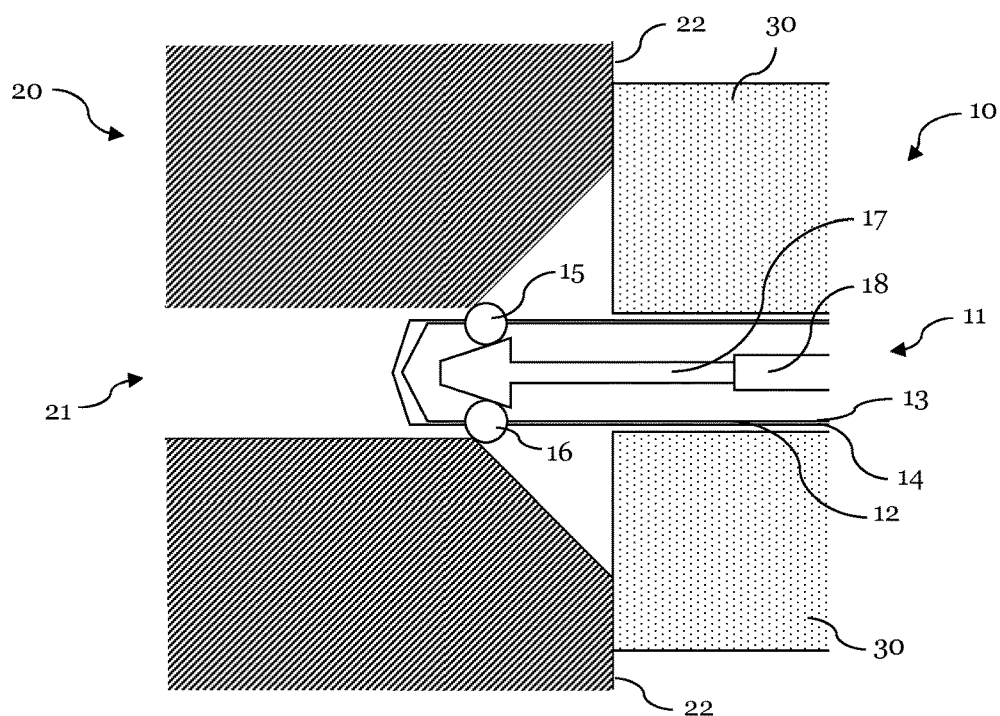

FIG. 4 shows a following step in inspecting hole 21. Compared to the situation of FIG. 3, the test mandrel 11 is moved further into the hole 21, and the interacting means 15, 16 are now in contact with the object 20. When moving the test mandrel further into the hole 21, the interacting means 15, 16 will be pushed back into or towards the hollow housing 12 of the test mandrel 11. Due to the coupling with the conical shape of restoring means 17, the restoring means 17 is moved thereby to the right in FIGS. 1 to 5. This movement of the restoring means 17 is detected by the detecting means 18 and thus the change of the relative position of the interacting means 15, 16. Thus, when the interacting means 15, 16 enter the hole 21 itself, this is detected by the detecting means 18 and the means 18 outputs a new signal, which is denoted as signal S2 in the following.

Figure 5:
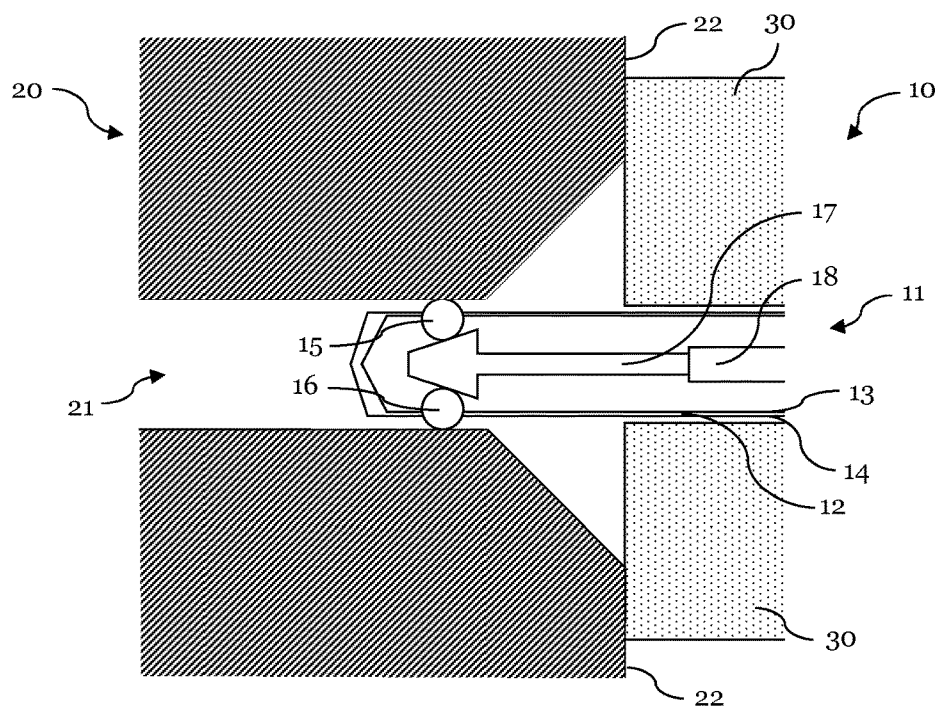

FIG. 5 shows the situation where the test mandrel 11 is further inserted into the hole 21 to be inspected. The interacting means 15, 16 are now in contact with the inner walls of the hole 21, and the detection means 18 is able to indicate the relative position of the interacting means 15, 16. A corresponding signal is denoted as signal S3 in the following.

Figure 6:
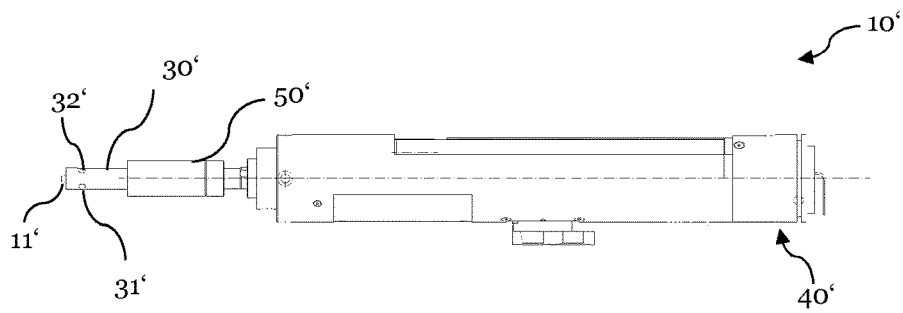
FIG. 6 is a schematic illustration of another measuring device according to the present invention.

Accordingly, since the geometry and dimensions of the measuring device are known, and also the amount of linear movement of the test mandrel, one can determine the depth of the counter sink and also the diameter of the hole 21 from the provided signals S1, S2 and S3. In particular, on the basis of signals S1 and S2, one can determine the depth of the counter sink, while signal S3 allows for determining the diameter of the hole 21. It is hence advantageously possible to measure both properties in one operation. As also the angle of the counter sink is known, the person skilled in the art can also easily determine or calculate the outside diameter $d_{CSO}$ of the counter sink. FIG. 6 shows a measuring device 10', comprising a test mandrel 11', a bushing 30' and automated actuating means 40' for moving the test mandrel 11' in longitudinal direction. The bushing 30' comprises two recesses or openings 31', 32', which are adapted to receive the interacting means 15', 16' (see detail view of FIG. 9) at least partially when the bushing 30' is in an initial position covering the test mandrel 11'. The initial position corresponds to the idle position of the measuring device 10', i.e. when the test mandrel 11' is not penetrating a hole to be inspected. The initial position further differs from a first position of the bushing 30', in which the inner walls of the bushing 30' are contacting the interacting means 15', 16'. The bushing 30' is favorably moved to the first position when the bushing 30' is coming in first contact with an object, similar to the situation illustrated in FIG. 2.

Figure 7:
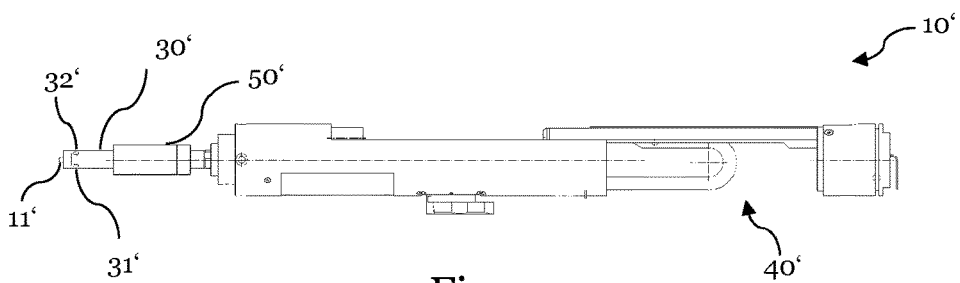
FIG. 7 shows the measuring device of FIG. 6 in another configuration.

FIG. 7 shows the measuring device of FIG. 6 in another configuration, i.e. with the test mandrel 11' being moved in longitudinal direction due to an operation of the automated actuating means 40'.

Figure 8:
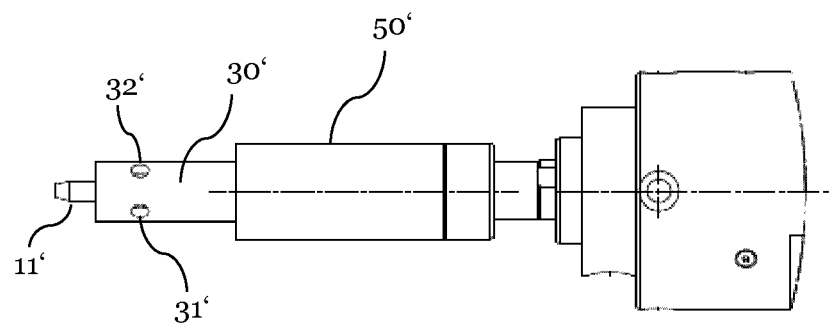
FIG. 8 shows a detailed view of a section of the measuring device of FIG. 6.

The illustration of FIG. 8 shows a detailed view of the tip of measuring device 11' of FIGS. 6 and 7. The bushing 30' covers the test mandrel 11', and the interacting means 15', 16' are provided in the openings 31', 32'. Hence the bushing 30' is in its initial position.

When the bushing 30' is in the following moved relative to the test mandrel 11' it is moved from the initial position to the first position, whereby the interacting means move out of their respective openings 31', 32' and come into contact with the inner walls of the bushing. In other words, the interacting means are pushed radially inwardly by the inner walls of the bushing and this change in position can be detected similar or identical as with the device of FIGS. 1 to 5. Accordingly, when the interacting means 15', 16' are exiting the openings 30', 31 and are moved or pressed in the hollow housing 12 via the contact with the bushing 30' a signal is generated at the detection means. This signal will be denoted as signal S0 in the following.

This signal S0 indicates that the bushing 30' is moved away from its initial position, i.e. that the bushing 30' has moved relative to the test mandrel 11'. Thereby, it is possible to determine when the measuring device 10' comes into contact with e.g. the surface 22, which is highly advantageous in automated inspection processes, when the measuring device is e.g. operated by an industrial robot. Accordingly, signal S0 indicates that the measuring device is in contact with the surface of the object to be inspected. Based on said information, the speed of the longitudinal movement, i.e. the speed induced by the automated actuating means, can for example be altered. It is hence possible to e.g. engage the hole with a high speed and to perform the inspection or actual measurement of the counter sink depth and hole diameter at a reduced velocity. Alternatively or in addition also other parameters can be altered based on signal S0. The following steps are analogous to the steps described with reference to FIGS. 1 to 5; i.e. also with the device of FIGS. 6 to 9 it is possible to determine the depth of a sink hole.

Figure 9:
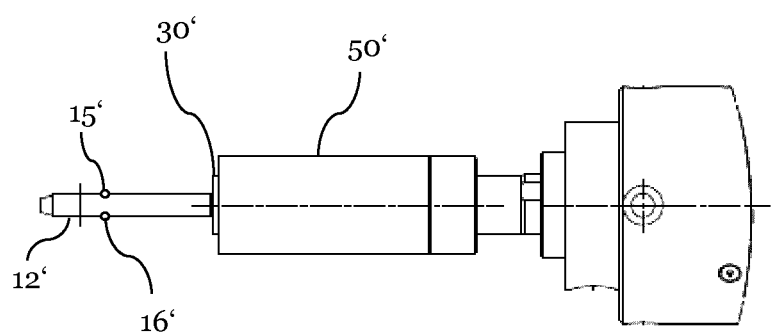
FIG. 9 shows a detailed view of a section of the measuring device of FIG. 6 in another configuration.

FIG. 9 illustrates the measuring device 10' with its test mandrel 11' being completely uncovered, as the bushing 30' is fully pushed back. Accordingly, the interacting means 15', 16' are uncovered and extend from the housing 12' of the test mandrel 11' as far as possible (maximum protrusion). Case 50' contains recovering means which are adapted to apply a reset force to urge the bushing 30' into the initial position. By way of example, the recovering means can comprise a spring or similar. The skilled person understands that the recovering means can be selected irrespective of whether the bushing features openings 31', 32' or not.

The person skilled in the art further understands that the figures discussed above are not drawn to scale, and that for example the interacting means can be of different forms. The skilled person thereby understands to choose appropriate components in order to achieve the desired resolution of the measuring device. Further on, it will be appreciated that the person skilled in the art understands to set the maximum extension of the interacting means according to the holes to be inspected and the expected quality and manufacturing tolerances of the holes.

Figure 10:
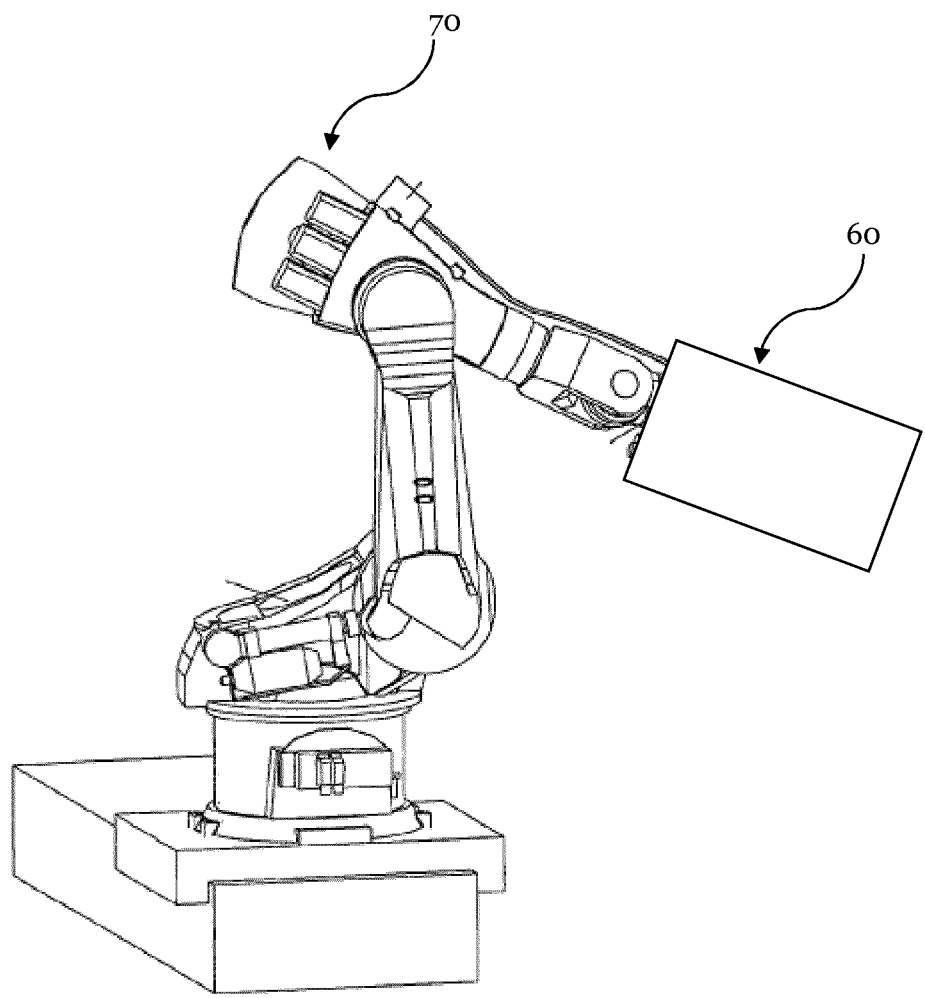
FIG. 10 shows in a schematic illustration an industrial robot with an end effector comprising the measuring device.

FIG. 10 shows in a purely schematic illustration an industrial robot 70 with an end effector 60 comprising the measuring device as described herein. The robot can be used for automatically inspecting holes or the end effector 60 may comprises additional tools for the automatic installation of mechanical fasteners, in particular rivets.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

REFERENCE CHART 10, 10' measuring device
11, 11' test mandrel
12, 12' hollow housing
13 inner wall of hollow housing
14 outer wall of hollow housing
15, 16, 15', 16' interacting means
17 restoring means
17' compression spring
18 detection means
20 object
21 hole in object
21' counter sink
22 outer surface of object
30, 30' bushing
31', 32' opening in bushing
40' actuating means
50' case comprising recovering means
60 end effector
70 robot
$d_h$ diameter of hole
$d_{CSi}$ inner diameter of counter sink
$d_{CSo}$ outer diameter of counter sink
$t_{CS}$ depth of counter sink
α chamfer angle of counter sink

What is claimed is:
1. A measuring device for inspecting a hole, the measuring device comprising:
a test mandrel comprising a hollow housing and interacting means arranged in the hollow housing, the interacting means configured to protrude at least partially through openings in the hollow housing and being arranged movable relative to the hollow housing;

detection means to detect a relative position of the interacting means; and a bushing in which the test mandrel is arranged, the bushing being movable relative to the test mandrel between a first position covering the interacting means, and a second position exposing the interacting means;

wherein the bushing is in contact with the interacting means when the bushing is in the first position.

2. The measuring device of claim 1, wherein the test mandrel further comprises restoring means configured to apply a reset force to urge the interacting means through the openings in the hollow housing such that the interacting means protrude from an outer surface of the hollow housing.

3. The measuring device of claim 1, wherein the detection means detects an exposure of the interacting means.

4. The measuring device of claim 1, wherein:
the bushing comprises a hollow tube having an inner diameter greater than an outer diameter of the hollow housing of the test mandrel; and
the bushing in the first position at least partially envelops the test mandrel.

5. The measuring device of claim 4, wherein an inner diameter of the bushing is smaller than a maximum protrusion of the interacting means through the openings in the hollow housing.

6. The measuring device of claim 1, wherein the interacting means comprises a spherical element arranged substantially inside the hollow housing and protruding partially through an opening of the hollow housing.

7. The measuring device of claim 6, wherein:
the opening of the hollow housing is circular; and
the diameter of the circular opening is less than the diameter of the spherical element.

8. The measuring device of claim 1, wherein the detection means generates a signal when the relative position of the interacting means changes.

9. The measuring device of claim 1, wherein the bushing comprises at least one recess or opening configured to receive the interacting means at least partially when the bushing is in an initial position different from the first position.

10. The measuring device of claim 9, wherein the relative position of the interacting means is changed when the bushing is moved from the initial position to another position.

11. The measuring device of claim 10, wherein the relative position of the interacting means is changed when the bushing is moved from the initial position to the first position.

12. The measuring device of claim 1, further comprising an automated actuating means configured to move the test mandrel in a longitudinal direction of the test mandrel.

13. The measuring device of claim 12, further comprising means to determine an amount of movement of the test mandrel in the longitudinal direction.

14. The measuring device of claim 1, further comprising recovering means configured to apply a reset force that urges the bushing into the first position or the initial position.

15. The measuring device of claim 1, wherein the measuring device is configured to measure a countersink depth and a diameter of a hole to be inspected.

16. A robotic end effector for fastening work pieces, the robotic end effector comprising a measuring device for inspecting a hole according to claim 1.

17. A method for inspecting a hole, the method comprising:
obtaining a measuring device in accordance with claim 1;
moving the measuring device toward a hole in a work piece until the bushing comes into abutment with a surface of the work piece surrounding the hole;
further moving the measuring device toward the hole, such that the test mandrel is moved relative to the bushing into the hole;
detecting with the detection means when the interacting means are no longer covered by the bushing and generating a first signal in response to such detection;
detecting with the detection means when the interacting means comes into contact with the inner walls of the hole and generating a second signal in response to such detection; and
determining from the first and second signals a distance that the test mandrel moved between generating of the first and second signals.

18. The method of claim 17, further comprising determining whether the hole is suitable to receive a predetermined fastener.

* * * * *